(12) United States Patent
Lin et al.

(10) Patent No.: US 8,069,456 B2
(45) Date of Patent: Nov. 29, 2011

(54) GUIDE MECHANISM FOR OPTICAL DISK DRIVE

(75) Inventors: Hung-Ming Lin, Taipei Hsien (TW); Xian Wei, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 895 days.

(21) Appl. No.: 12/104,455

(22) Filed: Apr. 17, 2008

(65) Prior Publication Data

US 2008/0263576 A1 Oct. 23, 2008

(30) Foreign Application Priority Data

Apr. 20, 2007 (CN) .......................... 2007 1 0200493

(51) Int. Cl.
*G11B 7/00* (2006.01)
*G11B 17/00* (2006.01)
*G11B 21/16* (2006.01)

(52) U.S. Cl. ...................... 720/675; 720/679; 369/249.1
(58) Field of Classification Search ............... 369/44.14, 369/244.1, 249.1; 720/675, 677, 679, 680
See application file for complete search history.

(56) References Cited

U.S. PATENT DOCUMENTS

| 6,046,974 | A | 4/2000 | Uehara | |
|---|---|---|---|---|
| 6,052,358 | A | 4/2000 | Morikawa et al. | |
| 6,597,652 | B2 * | 7/2003 | Obara | 720/675 |
| 2001/0038600 | A1 * | 11/2001 | Obara | 369/249 |
| 2001/0048656 | A1 * | 12/2001 | Furukawa et al. | 369/219 |
| 2003/0174636 | A1 * | 9/2003 | Feinberg et al. | 369/249 |
| 2005/0249057 | A1 * | 11/2005 | Yong-Mo | 369/44.14 |
| 2006/0080690 | A1 * | 4/2006 | Wu | 720/675 |
| 2008/0222667 | A1 * | 9/2008 | Lin et al. | 720/665 |
| 2008/0244631 | A1 * | 10/2008 | Lin et al. | 720/659 |

FOREIGN PATENT DOCUMENTS

| CN | 1274911 A | 11/2000 |
|---|---|---|
| CN | 1790498 A | 6/2006 |

* cited by examiner

*Primary Examiner* — Daniell L Negron
*Assistant Examiner* — Adam B Dravininkas
(74) *Attorney, Agent, or Firm* — Altis Law Group, Inc.

(57) ABSTRACT

A guide mechanism is configured for guiding an optical pick-up head to move on a chassis. The guide mechanism includes a carriage, a first guide rail, a second guide rail, and a buffering device. The carriage includes a main body for receiving the optical pick-up head, and a first engaging portion and a second engaging portion formed on two opposite sides of the main body. The first guide rail is slidably received in a slot of the first engaging portion. The second guide rail is slidably engaging with the second engaging portion. The buffering device is clipped between the first guide rail and the first engaging portion. An optical disk drive using the guide mechanism is also provided.

11 Claims, 6 Drawing Sheets

GUIDE MECHANISM FOR OPTICAL DISK DRIVE

BACKGROUND

1. Force of the Invention

The present invention generally relates to optical disk drives, and particularly to a guide mechanism for an optical disk drive to guide an optical pick-up head thereof.

2. Description of Related Art

A typical optical disk drive emits a laser beam to record information to an optical disk or reproduce information from the optical disk. The optical disk drive usually includes a chassis, a spindle motor, an optical pick-up head, and a guide mechanism. The chassis is configured for supporting other components. The spindle motor is used for rotating the optical disk. The optical pick-up head is configured for emitting the laser beam onto the optical disk to perform a read operation or a write operation. The guide mechanism is configured for guiding the optical pick-up head to move along a radial direction of the optical disk, in order to move the laser beam to specific areas of the optical disk.

A conventional structure of the guide mechanism generally includes two guide rails, a carriage, a conduct device, and a stepping motor. The guide rails are fixed on the chassis. The carriage receives the optical pick-up head and is slidably supported on the guide rails. The conduct device is configured for conducting a driving force from the stepping motor to the carriage. Therefore, in operation, the carriage holding the optical pick-up head is driven along the guide rails by the driving force. The carriage includes two engaging portions, and each engaging portion engages with a corresponding guide rail. In detail, a first engaging portion defines a slot therein, and a corresponding guide rail can be slidably received in the slot, while a second engaging portion defines a hole, and which the other guide rail passes through the hole.

In order to reduce friction, the engaging portion and the corresponding guide rail cooperatively defines a clearance therebetween. However, this clearance introduces play or instability when the optical pick-up head moves along the guide rails.

Therefore, improvements for a guide mechanism are needed in the industry to address the aforementioned deficiency.

SUMMARY

A guide mechanism is configured for guiding an optical pick-up head to move on a chassis. The guide mechanism includes a carriage, a first guide rail, a second guide rail, and a buffering device. The carriage includes a main body for receiving the optical pick-up head, and a first engaging portion and a second engaging portion formed on two opposite sides of the main body. The first guide rail is slidably received in a slot of the first engaging portion. The second guide rail slidably engages with the second engaging portion. The buffering device is slidably clipped between the first guide rail and the first engaging portion. An optical disk drive using the guide mechanism is also provided.

Other advantages and novel features of the present invention will become more apparent from the following detailed description of preferred embodiment when taken in conjunction with the accompanying drawings.

DETAILED DESCRIPTION OF THE EMBODIMENTS

Reference will now be made to the drawings to describe a preferred embodiment of the present guide mechanism.

Figure 1:
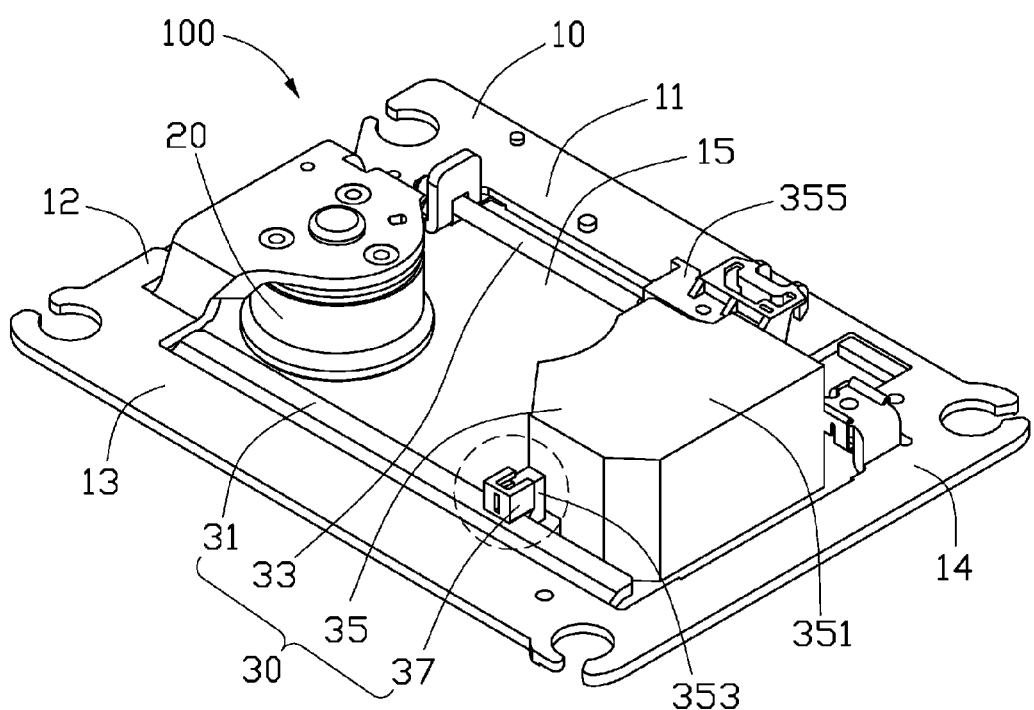
FIG. 1 is an isometric view of an optical disk drive in accordance with an exemplary embodiment, the optical disk drive including an optical pick-up head, and a guide mechanism.
Figure 6:
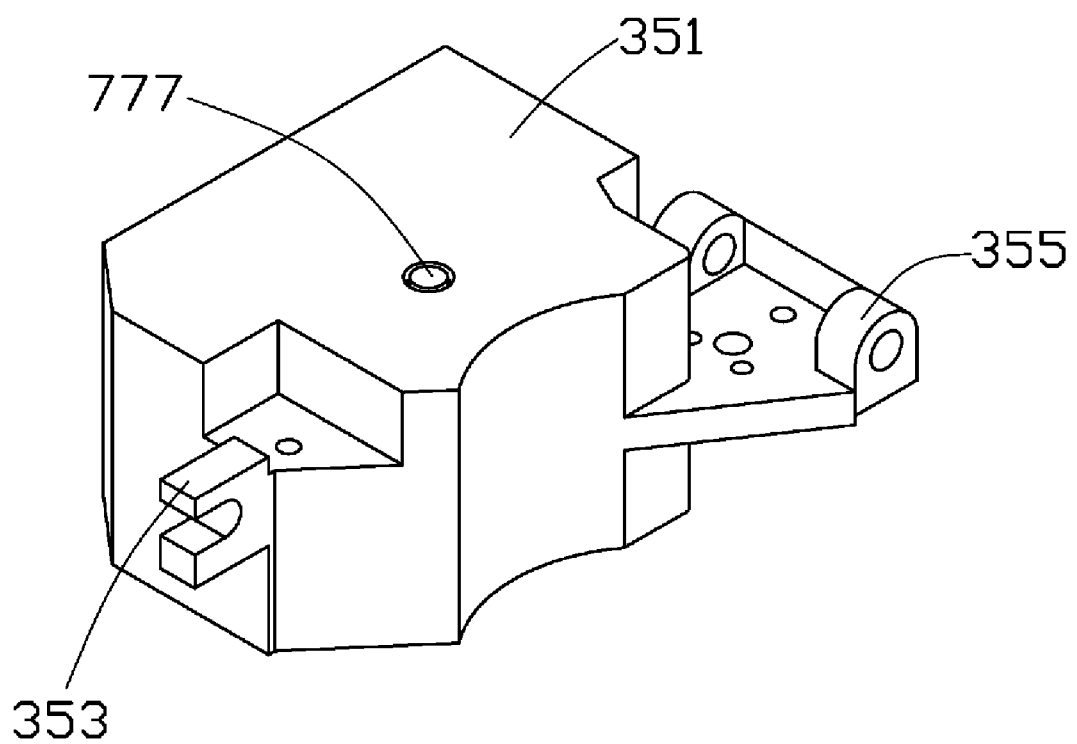
FIG. 6 is an isometric view of parts of the optical pick-up head, and a guide mechanism.

Referring to FIGS. 1 and 6, an optical disk drive 100 includes a chassis 10, a spindle motor 20, an optical pick-up head 777, and a guide mechanism 30 in accordance with an exemplary embodiment. The chassis 10 is configured for supporting the spindle motor 20, the optical pick-up head 777, and the guide mechanism 30. The spindle motor 20 is screwed on the chassis 10 and is used for rotating an optical disk. The optical pick-up head is configured for emitting a laser beam onto the optical disk to perform a read operation or a write operation. The guide mechanism 30 is configured for guiding the optical pick-up head 777 to move along a radial direction of the optical disk.

The chassis 10 includes a substantial rectangular frame consisting of four side pieces 11, 12, 13, 14, the side pieces are connected in the same numerical order as labeled. The chassis 10 also defines a rectangular opening 15 that is surrounded by the four side pieces 11, 12, 13, 14 in the middle of the chassis 10. The spindle motor 20 is fixed on the side piece 12 of the chassis 10.

The guide mechanism 30 includes a first guide rail 31, a second guide rail 33 parallel to the first guide rail 31, a carriage 35, and a spacer extension 37. In the embodiment, other components, such as a conduct device (not shown), a stepping motor (not shown), etc, are not depicted. The first guide rail 31 is molded integrally along the inner side of the side piece 13. The second guide rail 33 is secured on the chassis 10 over the opening 15. Two ends of the second guide rail 33 are respectively fixed on two opposite side pieces 12, 14. The carriage 35 is configured for receiving and protecting the optical pick-up head. The carriage 35 is movably supported on the first guide rail 31 and the second guide rail 33. The buffering device 37 is configured for slidably supporting the carriage 35 on the first guide rail 31.

The carriage 35 includes a main body 351, a first engaging portion 353, and a second engaging portion 355. The main body is configured for receiving/holding the optical pick-up head. The first engaging portion 353 is configured for engaging with the first guide rail 31 via the buffering device 37. The second engaging portion 355 is configured for engaging with the second guide rail 33.

Figure 2:
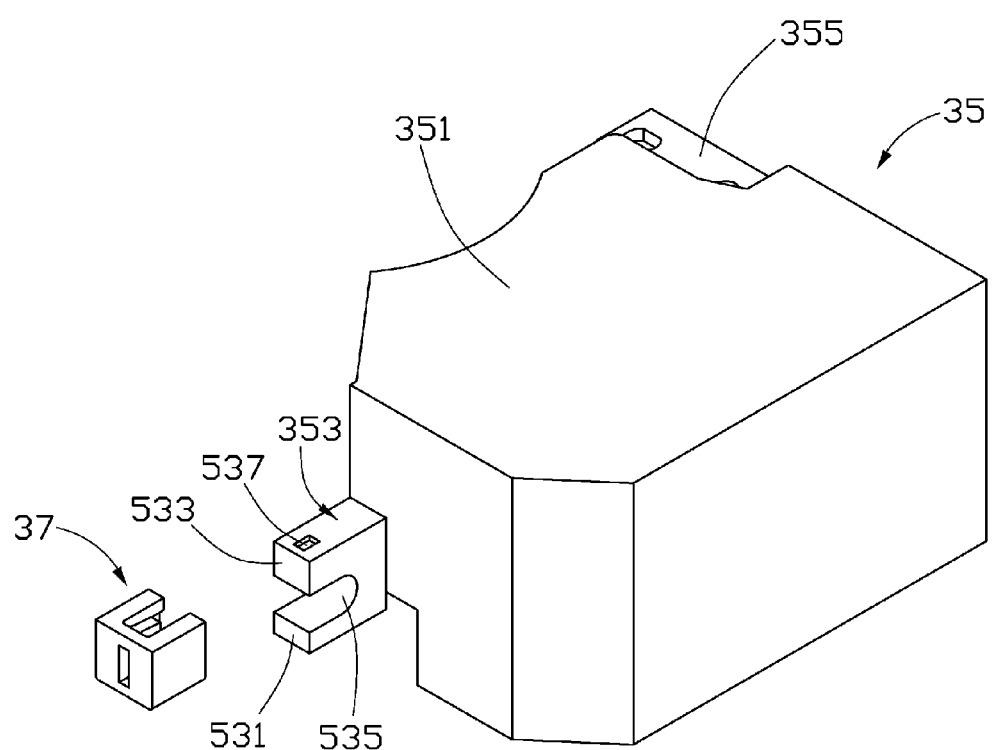
FIG. 2 is exploded, isometric view of a carriage of the optical disk drive of FIG. 1.

Referring to FIG. 2, the first engaging portion 353 and the second engaging portion 355 are formed on opposite sides of the main body 351. The first engaging portion 353 includes a first arm 531 and a second arm 533 connected with each other. The first engaging portion 353 defines a slot 535 between the first arm 531 and the second arm 533 to receive the first guide rail 31. The second arm 533 defines a recess 537 in a side wall of the second arm 533 opposite to the slot 535.

Figure 3:
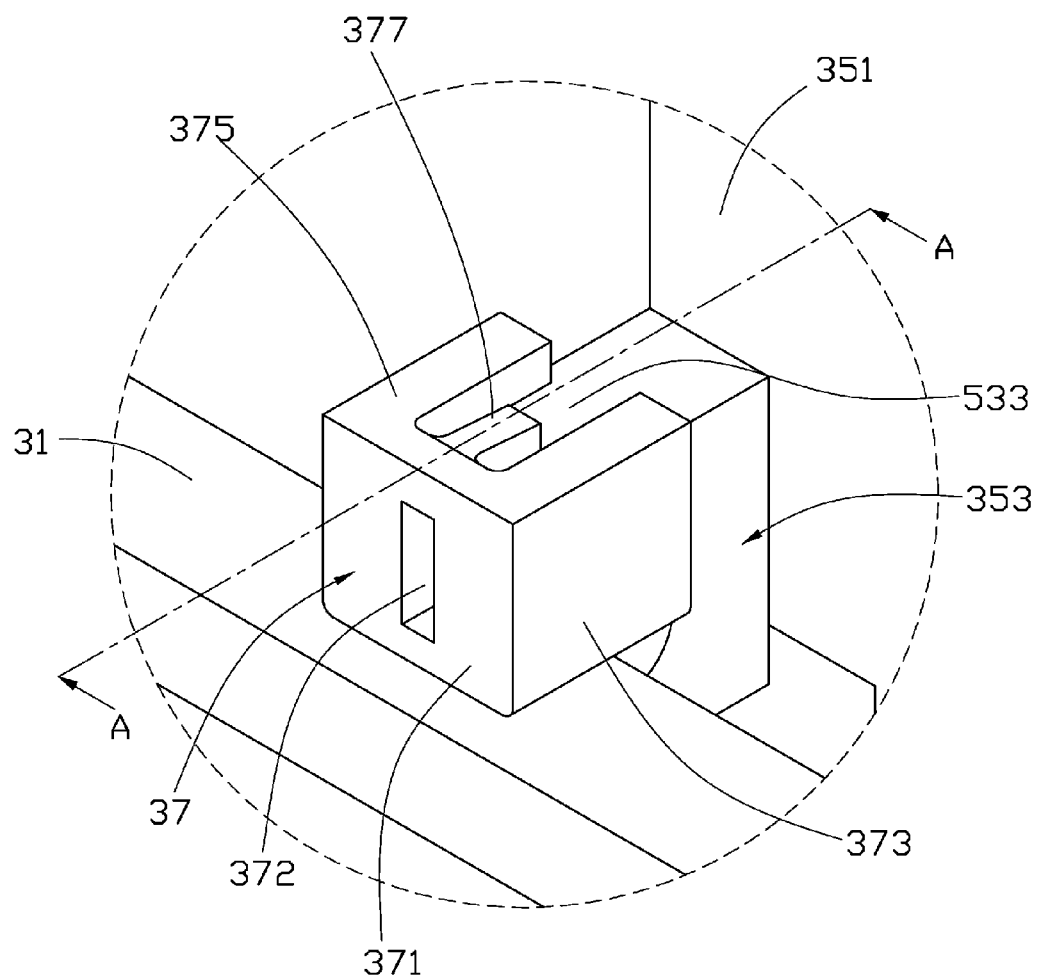
FIG. 3 is an enlarged isometric view of an engaging structure including a buffering device in the optical disk drive of FIG. 1.
Figure 4:
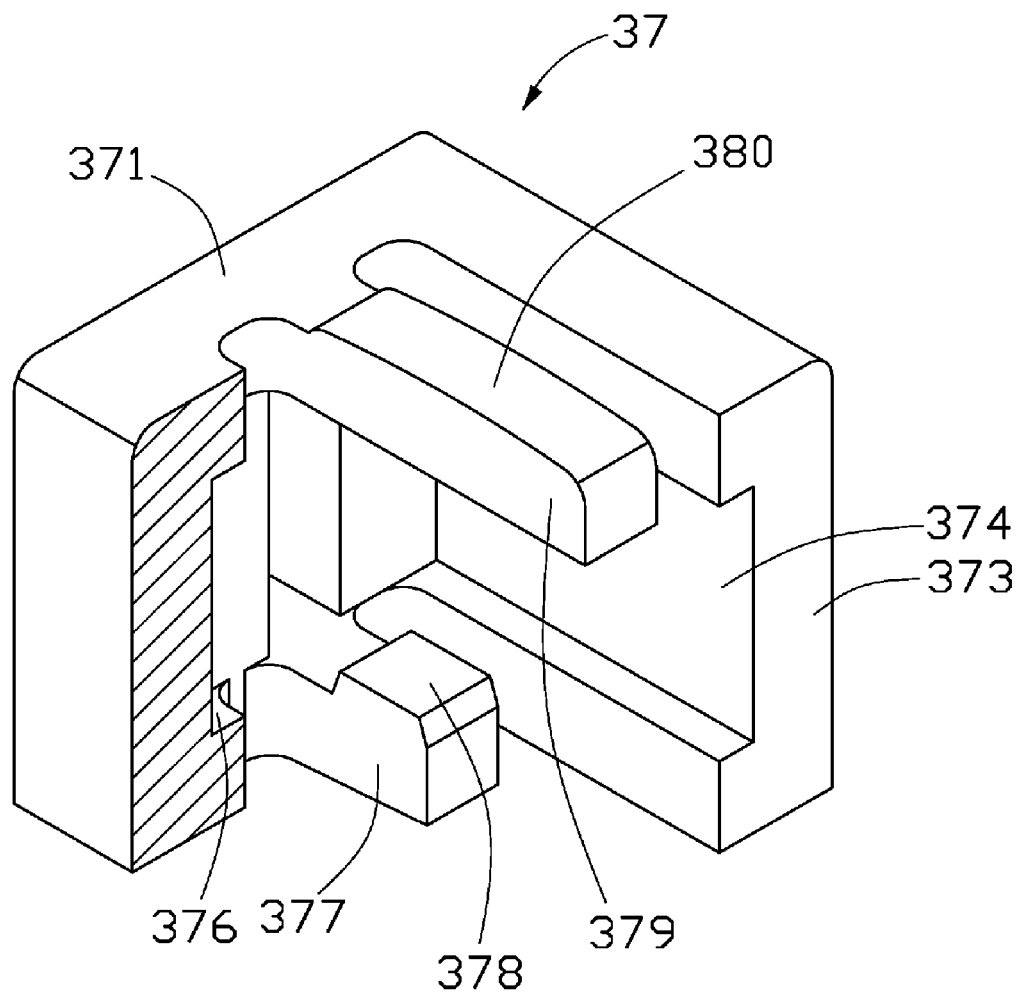
FIG. 4 is an inverted, part sectional view of the buffering device of FIG. 3.

Referring to FIGS. 2-4, the buffering device 37 is fastened to the second arm 533. The buffering device 37 includes a buffering portion 379 to fill in a clearance between the second arm 533 and the first guide rail 31. The buffering device 37 includes a base 371, a first side wall 373, a second side wall 375, a hooking portion 377, and the buffering portion 379. The first side wall 373, the second side wall 375, the hooking portion 377, and the buffering portion 379 extends from the base 371 and cooperatively defines a space for receiving the second arm 533. The fastener portion 377 and buffering portion 379 are formed as two cantilevers on opposite sides of the base 371. The first side wall 373 is parallel to the second side wall 375. Furthermore, the fastener portion 377 and the buffering portion 379 extend separately between the first side wall 373 and the second side wall 375.

The base 371 defines a rectangular hole 372 in the middle after a demolding process. The first side wall 373 defines a first receiving slot 374 for fittingly receiving a first part of the second arm 533. The second side wall 375 defines a second receiving slot 376 for fittingly receiving a second part of the second arm 533 opposite to the first part. The fastener portion 377 forms a protrusion 378 for hooking in the recess 537 of the second arm 533. The buffering portion 379 underlies the second arm 533, and also includes an arc outer surface 380 for resisting against the first guide rail 31.

Figure 5:
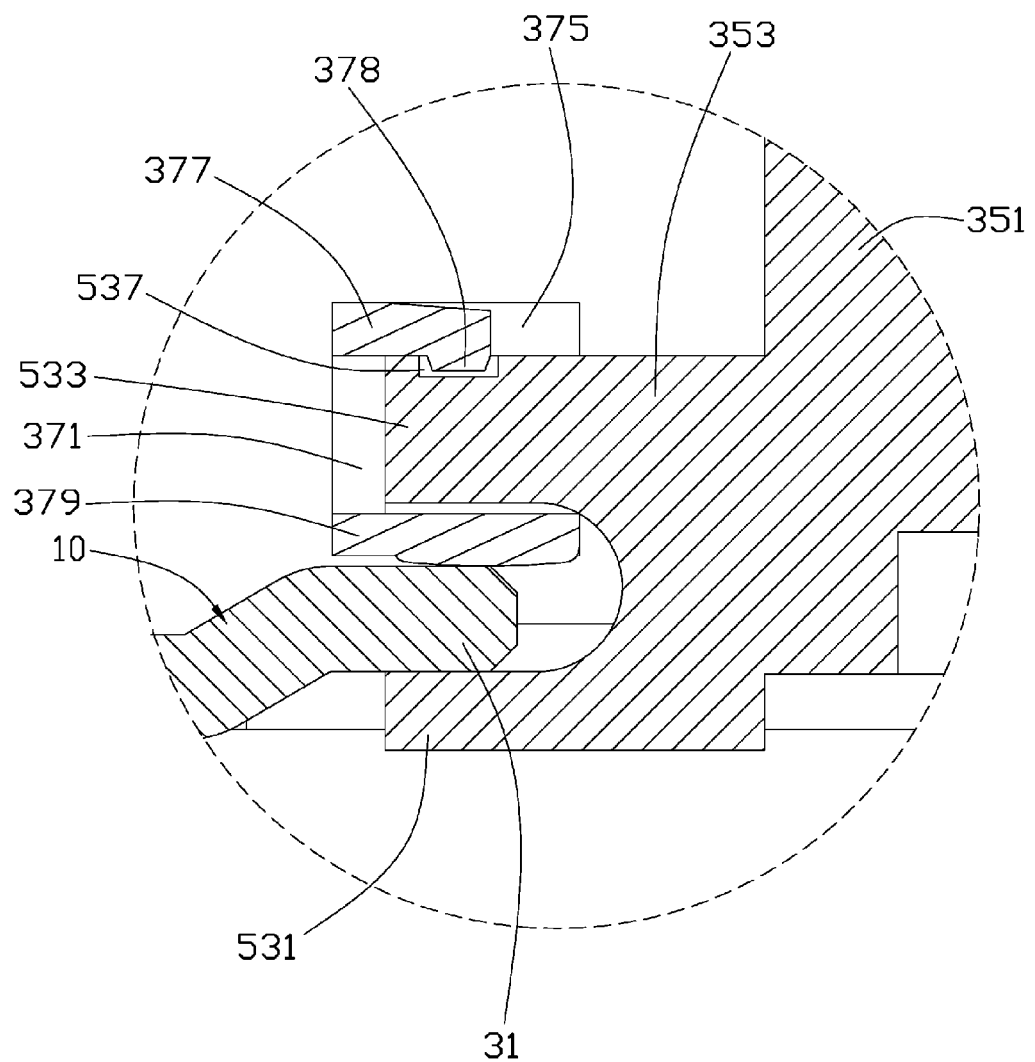
FIG. 5 is a cross-sectional view taken along line A-A of FIG. 3, showing the engaging structure.

In assembly, also referring to FIG. 5, the buffering device 37 is aligned adjacent to the second arm 533 correspondingly. Then the buffering device 37 is forcibly sleeved on the second arm 533. When the buffering device 37 is sleeved on the second arm 533, the fastener portion 377 and the buffering portion 379 initially deform away from each other before the protrusion 378 snaps into the recess 537. Subsequently, the fastener portion 377 and the buffering portion 379 return to their former positions and the second arm 533 partially slides into the first receiving slot 374 and the second receiving slot 376. After assembly, the first guide rail 31 is slidably clamped between the first arm 531 and the buffering portion 379.

As mentioned above, the clearance between the first engaging portion 353 and the first guide rail 31 is filled with the buffering portion 379 of the buffering device 37, thus the stability of the optical pick-up head with the carriage 35 is improved. Furthermore, the first side wall 373, the second side wall 375, the fastener portion 377, and the buffering portion 379 cooperatively fasten the buffering device 37 on the second arm 537 tightly, so as to prevent the buffering device 37 from detaching from the second arm due to friction.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A guide mechanism for guiding an optical pick-up head to move on a chassis, the guide mechanism comprising:
   a carriage comprising a main body for receiving the optical pick-up head, and a first engaging portion and a second engaging portion formed on two opposite sides of the main body, the first engaging portion comprising a first arm and a second arm connected with each other at their roots and extending from the main body, the first engaging portion defining a slot between the first and second arms and a recess in a sidewall of the second arm opposite to the slot;
   a first guide rail slidably received in the slot of the first engaging portion;
   a second guide rail slidably engaging with the second engaging portion; and
   a buffering device clipped between the first guide rail and the first engaging portion, wherein the buffering device comprises a fastener portion, the fastener portion forms a protrusion in the inner side thereof, the protrusion engages with the recess to fasten the buffering device to the first engaging portion.

2. The guide mechanism according to claim 1, wherein the buffering device fastens the second arm and comprises a buffering portion filling in a clearance between the second arm and the first guide rail.

3. The guide mechanism according to claim 1, wherein the buffering device comprises a base and a first side wall extending from the base, and defining a first receiving slot for fittingly receiving a first part of the second arm.

4. The guide mechanism according to claim 3, wherein the buffering device comprises a second side wall extending from the base, and defining a second receiving slot for fittingly receiving a second part of the second arm opposite to the first part.

5. The guide mechanism according to claim 4, wherein the fastener portion extends from the base.

6. The guide mechanism according to claim 4, wherein the buffering device comprises a buffering portion extending from the base and opposite to the fastener portion.

7. The guide mechanism according to claim 6, wherein the buffering portion comprises an arc outer surface for resisting against the first guide rail.

8. An optical disk drive comprising:
   an optical pick-up head;
   a chassis consisting of four side pieces surrounding a rectangular opening;
   a guide mechanism for guiding the optical pick-up head to move on the chassis across the opening, comprising:
   a carriage for receiving the optical pick-up head, the carriage comprising a main body, a first arm and a second arm connected with each other at their roots extending from the main body, the first arm and the second arm cooperatively defining a slot, the second arm defining a recess in a sidewall thereof opposite to the slot;
   a first guide rail molded integrally with the inner side of one of the side pieces and slidably received in the slot; and
   a buffering device sleeving around the second arm and clipped between the first guide rail and the second arm to reduce a clearance therebetween, wherein the buffering device comprises a base, a buffering portion extending from the base, and a fastener portion extending from the base and opposite to the buffering portion, the buffering portion is clipped between the second arm and the first guide rail, and forms a protrusion in the inner side thereof, the protrusion engages with the recess to fasten the buffering device to the first engaging portion.

9. The optical disk drive according to claim 8, wherein the guide mechanism comprises a second guide rail parallel to the first guide rail, and another side of the carriage slidably engages with the second guide rail.

10. The optical disk drive according to claim 8, wherein the buffering device defines two receiving slots on two sides opposite to each other are for respectively receiving two opposite sides of the second arm.

11. The guide mechanism according to claim 8, wherein the buffering portion comprises an arc outer surface for resisting against the first guide rail.

* * * * *